3,249,493
REPELLING TERMITES WITH THE FUNGUS PORIA MONTICOLA
Anders E. Lund, Pitcairn, Pa., assignor to Koppers Company, Inc., a corportaion of Delaware
No Drawing. Filed Jan. 29, 1963, Ser. No. 254,599
3 Claims. (Cl. 167—22)

This invention relates generally to termite control, and more particularly, to the control of termites by repelling termites from what could be their normal habitat.

Fungi may develop profusely throughout the burrows of termites. The ecological relationship between fungi and termites is not entirely known. The conditions which are conducive to the growth of fungi are also conducive to the growth of termites. Their close association may therefore be purely accidental. Some biologists, however, believe that the fungus so alters the structure of the wood that the termite is able to attack the wood. Other biologists feel that the wood itself, which the termites eat, does not supply proteinaceous material; and the termites cultivate the fungus in order to obtain the necessary protein for growth.

It has been discovered that, quite surprisingly therefore, termites may be repelled by the fungus *Poria monticola*.

The fungus, *Poria monticola*, is frequently present in soft-wood lumber. Particularly susceptible to this fungus is Douglas-fir and Sitka spruce which has been shipped in an unseasoned condition and then stacked in solid piles without proper ventilation. The infection may be present in the form of spores which develop if the lumber remains damp. It has been reported as a cause of dry-rot in buildings but it is usually confined to moist basements.

Normally, in lumber, the first indications of the presence of this rot are faint streaks or elongated patches of yellowish-brown or pinkish-brown discolorations. The wood seems to be brittle in that the fibers break off short and do not splinter if tested with a pen knife. The culture on a 2% malt agar forms a uniform soft woolly mycelial mat. At first, the culture is white but later may assume a brownish cast sometimes with a pinkish tinge.

In accordance with this invention using conventional biochemical procedures, the fungus may be prepared as a powder, as a liquid, or as an extract prepared therefrom for dusting, spraying or aerosol applications. For example, the mycelial mat may be filtered from the culture, dried, and ground to appropriate sized particles. The culture also may be used as a spray since it contains a metabolite which also repels termites. As is conventional in repellents and the like, the active ingredient may comprise only a small portion of the final composition; the remainder may be an appropriate vehicle, usually inert ingredients. For dust applications, clay, lime, talc, and the like, may be the vehicle; and for spraying or aerosol applications, water or a suitable inert solvent may be the vehicle to form either a true solution or a suspension, preferably employing a compatible emulsifying agent.

In accordance with this invention, termites may be repelled from a likely source of termite infestation by driving into the ground near the source wood stakes inoculated with the fungus. Since, of course, the fungus consumes the stake, it would be necessary to replace the stakes periodically.

As another measure, stumps and other debris of a wood nature around the house structure which can become a focal point of termite infestation can be inoculated with the fungus. Then, after the fungus consumes the stump or debris, it repels termites thereby clearing up this possible source of infestation.

Advantageously, the soil under the slab, which will constitute the floor of the building structure or the basement, may be sprayed or dusted with the fungus. The metabolite produced by the fungus poisons the soil to provide the repelling action to the termites. Since the slab will operate effectively as a vapor barrier, the metabolite life is indefinite. It is postulated that termite protection will be provided for at least five years.

The invention will be illustrated further by the following examples.

*Example I*

In this example, cubes of wood having sides ¾ of an inch long were used. Five of these cubes were partially decayed by the fungus, *Poria monticola*; five were partially decayed by the well-known termite attractant, *Lenzites trabea*; and five were maintained as sound wood. The cubes were sterilized but the mycelial mats were not removed from the cubes. Each cube was then placed in a jar and subjected to ten termites for a period of thirty days. In the jar containing the wood rotted by the fungus *Poria monticola*, all of the termites died; and 3.9 cubic millimeters of wood were eaten by the termites. In contrast, 86% of the termites in the jars containing the wood decayed by the wood fungus *Lenzites trabea* died, but 30.7 cubic millimeters of the wood was consumed. In the jar containing the sound wood, 30% of the termites died, and 112 cubic millimeters of the wood were eaten. The jar containing no food contained 96% dead termites.

*Example II*

Petri dishes containing agar were inoculated with the wood-destroying fungi, *Poria monticola*. The plates were allowed to remain undisturbed until fungal growth covered the agar. Ten termites (*Reticulitermes flavipes*) were added to each of the dishes. The dishes were then stored over water in a covered desiccator at 80° F. Two dishes were prepared in this manner and inoculated with the fungus, *Poria monticola*. Two other dishes were prepared in this manner and inoculated with the fungus, *Poria incrassata*. Two dishes as a control were also handled in this manner. At the end of three days, 10% of the termites in one dish containing the fungus, *Poria monticola*, were dead, and 80% in the other dish were dead. At the end of eight days 40% of the termites in one dish were dead, and all of the termites in the other dish were dead; at the end of fourteen days, 90% of the termites were dead; and at the end of twenty days, all of the termites were dead. In contrast, 20% of the termites in one control dish were dead. At the end of eight days, 10% of the termites in the other dish were dead. At the end of eleven days, 20% of the termites in both control dishes were dead. At the end of fourteen days, 90% of the termites in one control dish were dead, and 80% of the termites in the other control dish were dead. At the end of eighteen days, all termites in the control dishes were dead. Strangely, the dishes containing the *Poria incrassata* had no dead termites until the eighteenth day at which time 20% of the termites were dead. At the end of twenty-seven days, 40% of the termites were dead; at the end of thirty-five days, 80% of the termites were dead in one dish and 70% were dead in the other dish. At the end of forty-three days, all of the termites were dead in the one dish, but no more termites had died in the other dish. Thus, in the same genus of fungus, *Poria monticola*, while not particularly lethal to the termites, is a repellent, while *Poria incrassata* seems to prolong the life of the termites.

*Example III*

Petri dishes containing malt agar were inoculated with fungi. Six dishes were inoculated with the fungus, *Poria*

*monticola*; six dishes were inoculated with the fungus, *Poria incrassata*, and six dishes remained as malt agar controls. After the fungus in each dish was well developed, ten termites were added to each dish. The average life of the termites in the dishes containing *Poria monticola* was thirty-one days. The average life of the termites in the dishes containing *Poria incrassata* was sixty-two days. The average life of the termites in the control dishes was fifty-eight days.

*Example IV*

Sterilized petri dishes containing malt agar were inoculated with the wood-destroying fungus, *Poria monticola*. After the agar surface was covered with the mycelial mat, ten termites were added to each dish. Control dishes contained only the malt agar. The dishes were placed over distilled water in a covered desiccator maintained at about 74° F. About every two days, the dishes were removed and examined. The average termite life was as follows:

TERMITE MORTALITY VS. TIME OF EXPOSURE TO AGAR AND FUNGI

|  | Percent mortality at inspection periods | | | | | |
|---|---|---|---|---|---|---|
|  | 3 days | 8 days | 11 days | 14 days | 18 days | 20 days |
| No. 1 | 10 | 40 | 60 | 90 | 90 | 100 |
| No. 2 | 80 | 100 |  |  |  |  |
| Control | 0 | 10 | 20 | 80 | 100 |  |

*Example V*

Petri dishes containing agar were inoculated with the fungus, *Poria monticola*, and other dishes with the fungus, *Poria incrassata*. A control dish was not inoculated. After the fungus had developed well on the agar, ten termites were placed in each dish. The dishes were examined every two days for the number of vertical penetrations and horizontal tunnels constructed by the termites in the agar, the length of the tunnels constructed and the termite life span. The results are as follows:

| Fungus | Vertical penetrations through agar, average number | Horizontal tunnels in agar | | Termite life span days, average |
|---|---|---|---|---|
|  |  | Average number | Average length, mm. |  |
| *Poria monticola* | 0.2 | 0 | 0 | 32 |
| *Poria incrassata* | 2.0 | 1.0 | 9.3 | 56 |
| Control | 1.6 | 0.6 | 3.7 | 32.3 |

*Example IV*

A pine wood plank was cut into cubes having sides ¾ of an inch long. Ten of the cubes were maintained as sound wood. Ten other of these cubes were inoculated with the fungus *Poria monticola*. Five of the ten cubes partially decayed by the fungus were subjected to extraction with water; these five cubes were then destroyed, and the aqueous extract was bottled and capped. The remaining five cubes which were partially decayed by the fungus *Poria monticola* were then air dried thereby inhibiting the fungus. Six months later, tests were made by placing a cube of sound wood and a cube of wood partially decayed by the fungus in a jar and subjected to the action of ten termites. In each case, the termites attacked the sound wood but refused to touch the wood decayed by the fungus *Poria monticola*. Ten termites were placed in another jar which contained a cube of sound wood and a cube of wood which had been dipped in the aged aqueous extract of the fungus *Poria monticola*. The termites again attached the sound wood but did not attack the wood which has been contaminated with the extract of the fungus *Poria monticola*.

The foregoing illustrates that the storage life of the repellent is of indefinite length. While the foregoing example utilizes water as an extractant, it is to be recognized, of course, that other compatible extractants can be used, such as, for example, methanol, ethanol, alcohol-benzene, acetone, ether, and the like.

The foregoing tests were carried out with types of termites that are prevalent in the United States; namely *Reticulitermes flavipes* (Kollar) and *R. virginicus* (Banks).

I claim:

1. A process of controlling termite infestation of building structures which comprises poisoning the soil with the fungus *Poria monticola* thereby repelling termites.

2. A process of repelling termites which comprises inoculating an area susceptible to termites with the fungus *Poria monticola*.

3. A process of controlling termite infestation of building structures which comprises poisoning the soil with a material selected from the class consisting of the fungus *Poria monticola* and the product obtained by culturing the fungus *Poria monticola* on a suitable nutrient culture media thereby repelling termites.

References Cited by the Examiner

American Type Culture Collection, strain No. 11538.

Cartwright, Decay of Timber and Its Preservation, Dept. of Scientific and Industrial Research, London, Her Majesty's Stationery Office (1958), page 181.

Chem. and Eng. News, Dec. 22, 1958, vol. 36, No. 51, p. 15.

Hanna, Handbook of Agricultural Chemicals, 2nd Ed., 1958, pp. 410–412.

Hilgardia, vol. 23, No. 1, May 1954, pp. 1–23 (pp. 1–3 relied on).

Pfizer, Handbook of Microbial Metabolites, 1961, pp 285–286.

Science, vol. 129, No. 3348, Feb. 27, 1959, pp. 537–544.

Washington Daily News, April 7, 1959, page 3.

JULIAN S. LEVITT, *Primary Examiner*.

S. J. FRIEDMAN, *Assistant Examiner*.